US005529444A

United States Patent [19]

Obermeier

[11] Patent Number: 5,529,444

[45] Date of Patent: Jun. 25, 1996

[54] TOOL BIT AND TOOL BIT CHUCK FOR MANUALLY OPERATED TOOLS

[75] Inventor: Josef Obermeier, Peiting, Germany

[73] Assignee: Hilti Aktiengesellschaft, Schaan, Liechtenstein

[21] Appl. No.: 353,575

[22] Filed: Dec. 9, 1994

[30] Foreign Application Priority Data

Dec. 9, 1993 [DE] Germany .......................... 43 41 970.4

[51] Int. Cl.$^{6}$ ............................ B23B 51/02; B23B 31/22

[52] U.S. Cl. ............................ 408/226; 279/19; 408/240

[58] Field of Search ................................ 408/226, 239 R, 408/239 A, 240; 279/19, 19.2, 19.3, 19.4, 19.5, 19.6, 75

[56] References Cited

U.S. PATENT DOCUMENTS

| | | | |
|---|---|---|---|
| 5,076,371 | 12/1991 | Obermeier et al. | 279/19.3 |
| 5,324,145 | 6/1994 | Kleine | 408/240 |
| 5,397,203 | 3/1995 | Kleine et al. | 279/19.3 |

FOREIGN PATENT DOCUMENTS

| | | |
|---|---|---|
| 0171358 | 7/1985 | European Pat. Off. . |
| 0355071 | 8/1989 | European Pat. Off. . |
| 0549008 | 11/1992 | European Pat. Off. . |
| 0551795 | 12/1992 | European Pat. Off. . |
| 0579579 | 7/1993 | European Pat. Off. . |
| 9314416 | 9/1993 | Germany . |

*Primary Examiner*—Daniel W. Howell
*Attorney, Agent, or Firm*—Anderson Kill Olick & Oshinsky

[57] ABSTRACT

A tool bit for insertion into a tool bit chuck in a manually operated tool used for chiseling and/or percussion drilling has an axially extending chucking shank (1). The chucking shank has two axially extending rotary entrainment grooves (2) open at its end inserted into the chuck and located diametrically opposite one another. In addition, the chucking shank (1) has a locking groove (3) closed at its ends extending transversely of the axial direction and serving to lock the tool bit in the axial direction. Further, the chucking shank (1) has an axially extending groove (4) and an additional axially extending groove (5) for providing greater surface areas in entrainment side flanks for transmitting torque. The axially extending groove (4) extends through a part of the locking groove (3) so that an end face (**3*a*) is formed extending transversely of the axial direction. The additional axially extending groove (5) is located diametrically opposite the locking groove (3) and has a larger transverse cross-sectional area than the rotary entrainment grooves (2**).

8 Claims, 2 Drawing Sheets

TOOL BIT AND TOOL BIT CHUCK FOR MANUALLY OPERATED TOOLS

BACKGROUND OF THE INVENTION

The present invention is directed to a tool bit for insertion into a tool bit chuck in a manually operated tool used for chiseling and/or percussion drilling and having a chucking shank with at least two axially extending rotary entrainment grooves open at the end of the shank inserted into the chuck and at least one locking groove closed at its ends extending transversely of the axial direction and located in the outside surface of the shank between the rotary entrainment grooves.

Tool bits for manually operated tools are disclosed in DE-PS 25 51 125 with the chucking shank of these tool bits having one or two locking grooves closed at the ends extending transversely of the axial direction along with one or two rotary entrainment grooves open at the end of the shank inserted into the chuck. The tool bit chuck into which the tool bits are inserted has one or two radially displaceable locking elements in the form of balls, however, it is known to use rollers instead of balls for the locking elements. By engagement of the locking elements in the locking grooves, a positively locked connection is established for the tool bit in the tool bit chuck. Such a positively locked connection can be released by a radially outward displacement of the locking element, whereby the tool bit can be removed from the chuck. Since the rotary entrainment grooves in the tool bit cooperate with entrainment strips in the tool bit chuck for effecting the transmission of torque from the chuck to tool bit, especially high loads are not applied in the locking grooves cooperating with the locking elements. It is only when the tool bits are pulled from a bore in a structural part that certain axial forces must be transmitted by the locking grooves in cooperation with the locking elements for assuring that the connection between the tool bit and the tool bit chuck is maintained.

A very high load or stress is applied to the rotary entrainment grooves open at the end of the chucking shank inserted into the chuck which engage with matching entrainment strips in the chuck. Such high stress is a result of the torque transmitted from the tool bit chuck to the tool bit. This torque increases with an increase in the diameter of the working region of the tool bits being used.

Due to present trends where tool bits with larger diameters in the working region are increasingly being used in manually operated tools, a considerable wear phenomenon occurs in the rotary entrainment grooves due to the very great torques to be transmitted and a premature failure of the tool bits may occur. Such premature failure caused by the rotary entrainment grooves may take place before the normal wear caused by conventional use is reached in the working region of the tool bit.

SUMMARY OF THE INVENTION

Therefore, the primary object of the present invention is to provide a tool bit capable of transmitting such large torques without experiencing wear in cooperation with the suitable tool bit chuck, so that failure resulting from wear of the tool in the rotary entrainment grooves does not occur before the usual wear of the working region of the tool bit resulting from normal use.

In accordance with the present invention, an axially extending groove open at the end of the chucking shank inserted into the chuck extends axially through a part of the locking groove, so that an end face, directed away from the end of the chucking shank inserted into the chuck, is formed and at least one additional axially extending groove also open at the end of the chucking shank is provided in the outside surface of the shank opposite the locking groove and located between the rotary entrainment grooves.

Additional flanks are provided by the axially extending groove and the additional axially extending groove with certain of the flanks being available for transmitting torque. The end face formed in the locking groove in the region outside the axially extending groove is available for transmitting axial forces, and it is to be noted that the axial forces occurring in this region are small and arise only when the tool bit is pulled out of a bore in a structural part. Accordingly, the end face is fully sufficient for transmitting such axial forces.

Certain advantages are gained with regard to constructional as well as manufacturing features, if in a preferred manner the additional axially extending groove is located diametrically opposite the locking groove. Accordingly, the diametrically opposite location of the additional axially extending groove can be arranged as far as symmetry is concerned in that the axially extending groove is disposed equiangularly spaced from the adjacent rotary entrainment grooves.

With such an arrangement, compatibility of such tool bits with another known tool bit chuck is achieved where the chuck has a locking element and an entrainment strip arranged diametrically opposite one another.

It must be noted when using the inventive tool bit in a known tool bit receptacle that the advantages of the invention are not fully attained, since the surface share of the flanks for transmitting torque has not been increased. An increase of the surface shares of the flank can be achieved in a simple manner by providing additional entrainment strips in the tool bit receptacle, for instance the tool bit receptacle in DE-PS 25 51 125 can be provided with two entrainment strips arranged symmetrically to the locking groove and to the additional axially extending groove.

To prevent faulty locking from taking place with the inventive tool bit in tool bit chucks having a single locking element, there is the possibility in another embodiment of the present invention to arrange additional axially extending grooves so that unequal angular spacings are provided between adjacent entrainment grooves.

Arranging the additional axially extending grooves at equal or unequal angular spacings relative to the adjacent rotary entrainment grooves can be utilized where the dimension of the interior cross-section of the rotary entrainment grooves is preferably less than the interior cross-sectional of the additional axial extending grooves. In particular this feature must be observed if the additional axially extending groove is located equiangularly spaced from the adjacent rotary entrainment grooves, since the previously mentioned known tool bit chuck comprises a similarly shaped entrainment strip diametrically opposite the locking groove. Accordingly, complete compatibility exists with the known tool bit chuck.

To avoid weakening the transverse cross-section of the chucking shank by including the additional axially extending groove and to prevent the above-mentioned faulty locking, there is the possibility of employing additional axially extending grooves. From the aspect of a symmetrical arrangement, which is advantageous for manufacturing reasons, it is possible to provide several additional axially extending grooves with equiangular spacings with respect to the adjacent rotary entrainment grooves and thereby eliminate the possibility of a faulty locking.

To assure an adequately large end face directed away from the end of the chucking shank inserted into the chuck, it is preferable to dispose the axially extending groove at different angular spacings relative to the adjacent rotary entrainment grooves. Assuming that the locking groove is equiangularly spaced relative to the adjacent entrainment grooves, an offset of the axially extending groove affords the requisite magnitude of the end face.

The axially extending groove and the additional axially extending groove have the advantage of providing at least one entrainment side flank extending at least substantially radially. Accordingly, the internal cross-sectional shape of the axially extending groove and the additional axially extending groove can be randomly shaped. These grooved can be U-shaped, V-shaped or have a flattened configuration. It is merely required that one flank be present on the entrainment side with at least a portion of the flank extending substantially radially.

The tool bit arranged in the above manner has the advantage that it can be used in various commercially available tool bit chucks. For instance, it can be used in tool bit chucks corresponding to the chuck in DE-PS 25 51 125, in tool bit chucks with two locking elements disposed diametrically opposite one another, and also in tool bit chucks where one entrainment strip is arranged diametrically opposite to a locking element. If the inventive tool bit is used in a known tool bit chuck, all of the advantages of the invention cannot be attained, that is the avoidance of wear when transmitting larger torques. If this limitation is accepted which results from the present conditions mentioned above, the advantage of compatibility with various commercially available tool bit chucks and with the invented tool bit can be achieved. The advantages of the invention are gained in full, however, if the inventive tool bit is used in a tool bit chuck which has at least one radially displaceable locking element cooperating with the closed ended locking groove, at least two entrainment strips cooperating with the rotary entrainment grooves open at the end of the chucking shank, at least one axially extending strip cooperating with the axially extending groove also open at the end of the chucking shank along with at least one additional axially extending strip cooperating with the additional axially extending groove open at the end of the chucking shank.

The arrangement of the axially extending strip and the additional axially extending strips can vary to correspond with the arrangement and configuration of the axially extending groove and the additional axially extending grooves.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
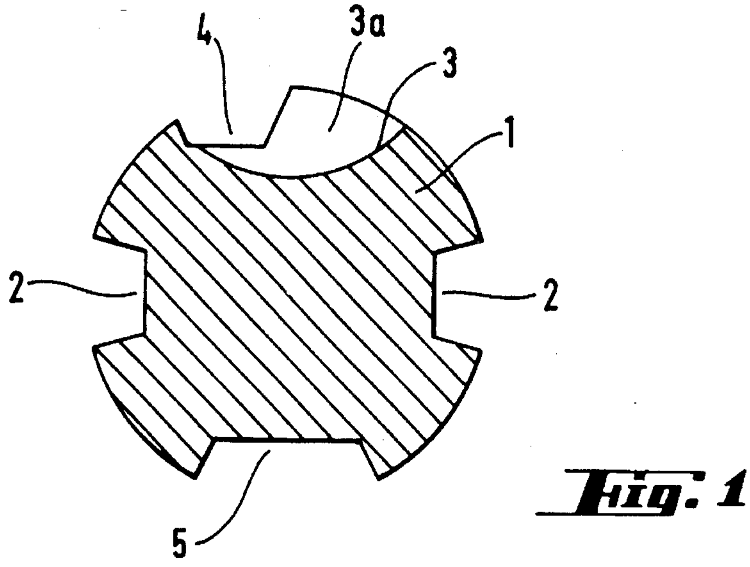
FIG. 1 is a transverse cross-sectional view through a chucking shank of a tool bit embodying the present invention.

In FIG. 1 an axially extending chucking shank 1 of a tool bit is shown in transverse section. The chucking shank 1 has two axially extending rotary entrainment grooves 2 open toward the end of the chucking shank inserted into the chuck with the grooves located diametrically opposite one another. A locking groove 3 closed at its ends extending transversely of the axial direction is equiangularly spaced apart in the outside surface of the shank from the rotary entrainment grooves 2. An axially extending groove 4 extends through a part of the transverse section of the locking groove 3. An end face **3*a* of the locking groove facing away from the end face of the chucking shank is formed in that part of the locking groove not traversed by the axially extending groove 4** and serves for transmitting axial forces.

In addition, FIG. 1 also shows an additional axially extending groove 5 open at the end of the chucking shank 1 to be inserted into the chuck and located between the rotary entrainment grooves 2 in the outside surface of the shank opposite the locking groove 3. This additional axially extending groove 5 is equiangularly spaced from the rotary entrainment grooves 2.

Figure 2:
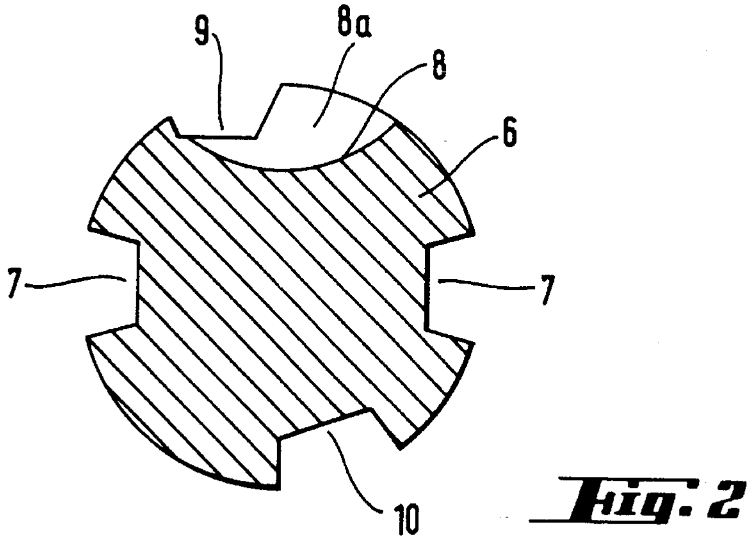
FIG. 2 is a cross-sectional view, similar to FIG. 1, of a chucking shank of another tool bit embodying the present invention.

In FIG. 2 another tool bit is illustrated having a chucking shank 6 with two rotary entrainment grooves 7 open at the end of the shank to be inserted into a chuck. A locking groove 8 is provided in the outside surface of the chuck equiangularly spaced from the rotary entrainment grooves 7. An axially extending groove 9 extends through a part of the transverse section of the locking groove 8 and is offset with respect to the locking groove so that an end face **8*a* is formed directed away from the end of the chucking shank 6** to be inserted into a chuck.

An additional axially extending groove 10, open toward the end of the chucking shank 6 to be inserted into a chuck, is located in the outside surface of the shank between the rotary entrainment grooves 7 and located opposite the locking groove 8. This additional axial extending groove 10 has different spacings in the angular direction relative to the two rotary entrainment grooves 7, and this arrangement prevents faulty locking in certain commercially available tool bit chucks.

Figure 3:
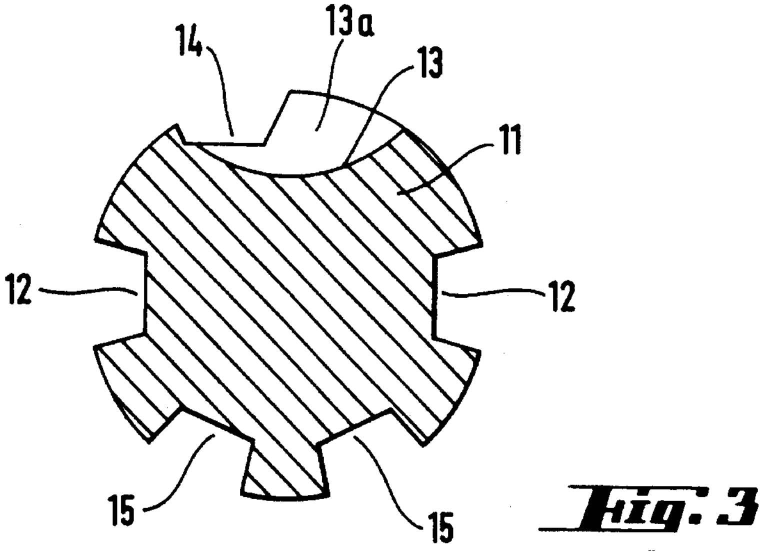
FIG. 3 is a transverse cross-sectional view, similar to FIGS. 1 and 2, of a chucking shank of still another tool bit embodying the present invention.

In FIG. 3 a tool bit is shown with an axially extending chucking shank 11 having rotary entrainment grooves 12 in its outside surface with the grooves being open at the end of the shank to be inserted into a chuck. Further, the rotary entrainment grooves 12 are located diametrically opposite one another. Equiangularly spaced between the rotary entrainment grooves is a locking groove 13. An axially extending groove 14, open at the end of the chucking shank to be inserted into the chuck, extends through a part of the transverse section of the locking groove 13. Due to the offset arrangement of the axially extending groove 14 relative to the locking groove 13, an end face **13*a*** is formed directed away from the end of the chucking shank to be inserted into a chuck.

Furthermore, FIG. 3 shows two additional axially extending grooves 15 each open at the end of the chucking shank to be inserted into a chuck and located in the outside surface of the shank 11 opposite the locking groove 13. Each of the additional axially extending grooves 15 is equiangularly spaced from the adjacent rotary entrainment groove 12. With the arrangement of the additional axially extending grooves 15 affording a symmetrical arrangement, faulty locking of the tool bit in certain commercially available tool bit chucks is avoided.

Figure 4:
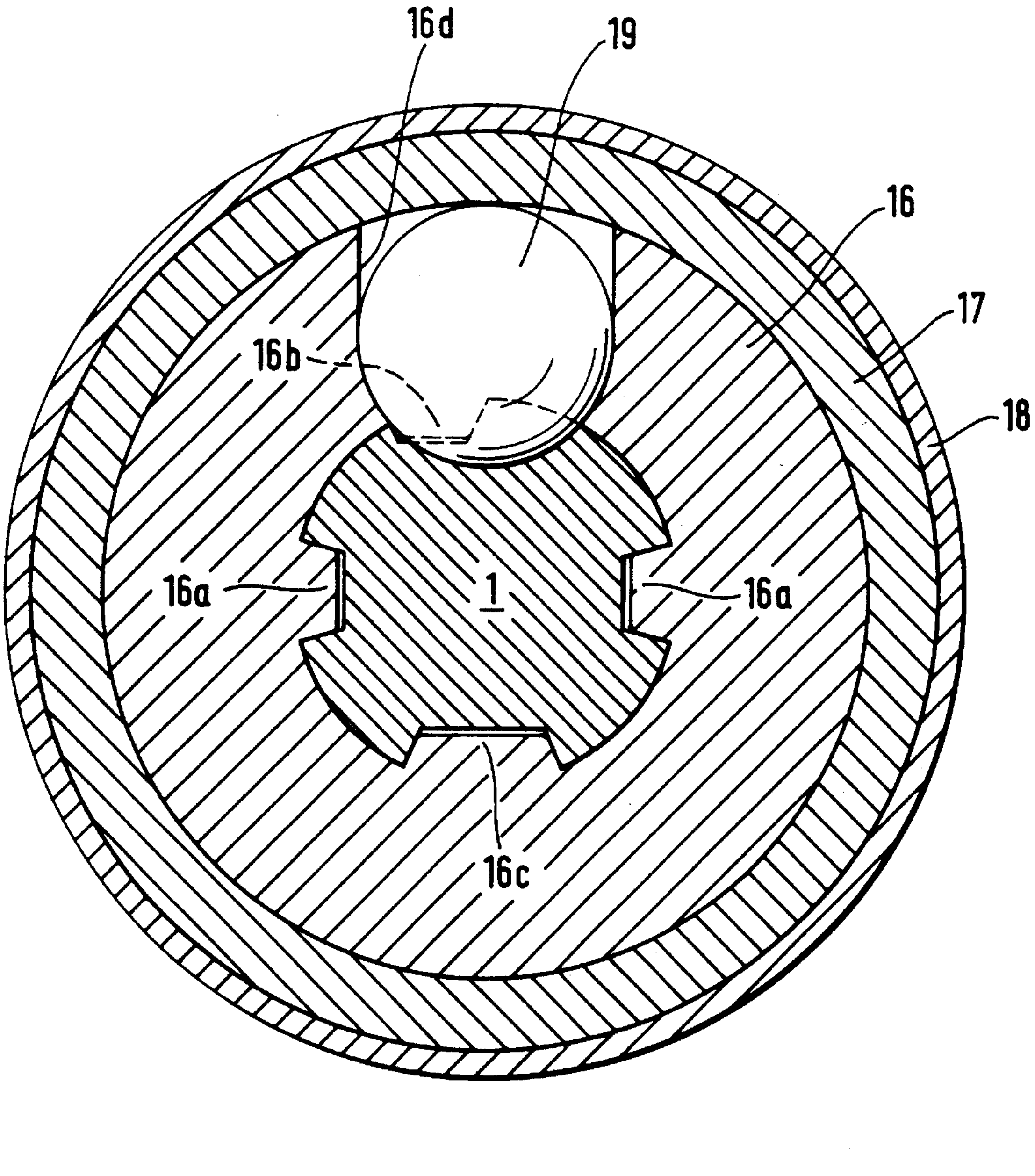
FIG. 4 is transverse cross-sectional view of a simplified arrangement of a tool bit chuck holding the clamping shank of the tool bit shown in FIG. 1.

FIG. 4 is a transverse section through a simplified illustration of a tool bit chuck containing a tool bit with a chucking shank 1 as shown in FIG. 1. The tool bit chuck is formed of an annular guide 16 encircled by an actuation sleeve 17 which, in turn, is laterally enclosed by a cage 18. Guide 16 has two axially extending entrainment strips **16*a* located diametrically opposite one another as well as an axially extending strip 16*b* and an additional axially extending strip 16*c*. The entrainment strips 16*a*, the axially extending strip 16*b* and the additional axially extending strip 16*c* afford the transmission of torque, so that in the transmission of the torque, wear is prevented or reduced due to the arrangement of the axially extending strip 16*b* and the additional axially extending strip 16*c***.

A locking element 19 in the form of a ball affords the axial locking of the tool bit with the chucking shank 1 in the chuck. Locking element 19 is arranged to be radially displaceable so that the tool bit can be removed from the tool bit chuck by effecting the radially outward displacement of the locking element from the locked condition shown in FIG. 4. An opening **16*d* extending through the guide 16 affords the requisite radial displaceability of the locking element 19**.

While specific embodiments of the invention have been shown and described in detail to illustrate the inventive principles, it will be understood that the invention may be embodied otherwise without departing from such principles.

I claim:

1. Tool bit for insertion into a tool bit chuck in a manually operated tool used for at least one of chiseling and percussion drilling, said tool bit comprising an axially extending chucking shank (1, 6, 11) with an axially extending outside surface and a first end for insertion into the tool bit shank, said shank having at least two axially extending rotary entrainment grooves (2, 7, 12) in the outside surface thereof and open at the first end thereof, and at least one first locking groove (3, 8, 13) closed at ends thereof extending transversely of the axial direction and located in the outside surface of said chucking shank (1, 6, 11) between said rotary entrainment grooves (2, 7, 12), wherein the improvement comprises that an axially extending groove (4, 9, 14), open at the first end of said chucking shank (1, 6, 11) extends through a part of the locking groove (3, 8, 13) so that an end face (**3*a*, 8*a*, 13*a*) directed away from the first end of said chucking shank is formed, and at least one additional axially extending groove (5, 10, 15) open at the first end of said chucking shank is located in the outside surface of said chucking shank between said rotary entrainment grooves (2, 7, 12) and opposite said locking groove (3, 8, 13), and said additional axially extending groove (5) is located diametrically opposite to said locking groove (3**).

2. Tool bit, as set forth in claim 1, wherein said additional axially extending groove (5) is equiangularly spaced from said rotary entrainment grooves (2).

3. Tool bit, as set forth in claim 2, wherein said additional axially extending groove (5) has a larger cross-sectional area as compared to the cross-sectional area of said rotary entrainment grooves (2).

4. Tool bit for insertion into a tool bit chuck in a manually operated tool used for at least one of chiseling and percussion drilling, said tool bit comprising an axially extending chucking shank (1, 6, 11) with an axially extending outside surface and a first end for insertion into the tool bit shank, said shank having at least two axially extending rotary entrainment grooves (2, 7, 12) in the outside surface thereof and open at the first end thereof, and at least one first locking groove (3, 8, 13) closed at ends thereof extending transversely of the axial direction and located in the outside surface of said chucking shank (1, 6, 11) between said rotary entrainment grooves (2, 7, 12), wherein the improvement comprises that an axially extending groove (4, 9, 14), open at the first end of said chucking shank (1, 6, 11) extends through a part of the locking groove (3, 8, 13) so that an end face (**3*a*, 8*a*, 13*a*) directed away from the first end of said chucking shank is formed, and at least one additional axially extending groove (5, 10, 15) open at the first end of said chucking shank is located in the outside surface of said chucking shank between said rotary entrainment grooves (2, 7, 12) and opposite said locking groove (3, 8, 13), and said axially extending groove (5) is located diametrically opposite to said locking groove (3) and the outside surface of said chucking shank (1) has several additional axially extending grooves (15**).

5. Tool bit, as set forth in claim 4, wherein said several additional axially extending grooves (15) are equiangularly spaced from adjacent said rotary entrainment grooves (12).

6. Tool bit receptacle with a receiving opening for a tool bit, as set forth in claim 1, wherein said tool bit chuck has at least one radially displaceable locking element (19) cooperating with said locking groove (3, 8, 13) closed at the end thereof extending transversely in the locking direction, at least two axially extending entrainment strips (**16*a*) cooperating with said rotary entrainment grooves (2, 7, 12) open at the end of said chucking shank to be inserted into said chuck, at least one axially extending strip (16*b*) cooperating with said axially extending groove (4, 9, 14) open at the end of said chucking shank (1) to be inserted into said chuck and at least one additional axially extending strip (16*c*) cooperating with the additional axially extending groove (5, 10, 15) open at the end of said chucking shank (1**) to be inserted into the chuck.

7. Tool bit for insertion into a tool bit chuck in a manually operated tool used for at least one of chiseling and percussion drilling, said tool bit comprising an axially extending chucking shank (1, 6, 11) with an axially extending outside surface and a first end for insertion into the tool bit shank, said shank having at least two axially extending rotary entrainment grooves (2, 7, 12) in the outside surface thereof and open at the first end thereof, and a single locking groove (3, 8, 13) closed at ends thereof extending transversely of the axial direction and at least one first locking groove (3, 8, 13) closed at ends thereof extending transversely of the axial direction and located in the outside surface of said chucking shank (1, 6, 11) between said rotary entrainment grooves (2, 7, 12), wherein the improvement comprises that an axially extending groove (4, 9, 14), open at the first end of said chucking shank (1, 6, 11) extends through a part of the locking groove (3, 8, 13) so that an end face (**3*a*, 8*a*, 13*a*) directed away from the first end of said chucking shank is formed, and at least one additional axially extending groove (5, 10, 15) open at the first end of said chucking shank is located in the outside surface of said chucking shank between said rotary entrainment grooves (2, 7, 12) and opposite said locking groove (3, 8, 13), said axially extending groove (4, 9, 14) is located at unequal angular spacings from adjacent said rotary entrainment grooves (2, 7, 12**).

8. Tool bit for insertion into a tool bit chuck in a manually operated tool used for at least one of chiseling and percussion drilling, said tool bit comprising an axially extending chucking shank (1, 6, 11) with an axially extending outside surface and a first end for insertion into the tool bit shank, said shank having at least two axially extending rotary entrainment grooves (2, 7, 12) in the outside surface thereof and open at the first end thereof, and a single locking groove (3, 8, 13) closed at ends thereof extending transversely of the axial direction and at least one first locking groove (3, 8, 13) closed at ends thereof extending transversely of the axial direction and located in the outside surface of said chucking shank (1, 6, 11) between said rotary entrainment grooves (2, 7, 12), wherein the improvement comprises that an axially extending groove (4, 9, 14), open at the first end of said chucking shank (1, 6, 11) extends through a part of the locking groove (3, 8, 13) so that an end face (3*a*, 8*a*, 13*a*) directed away from the first end of said chucking shank is formed, and at least one additional axially extending groove (5, 10, 15) open at the first end of said chucking shank is located in the outside surface of said chucking shank between said rotary entrainment grooves (2, 7, 12) and opposite said locking groove (3, 8, 13), and said axially extending groove (4, 9, 14) and said additional axially extending grooves (5, 10, 15) each comprise an entrainment-side flank extending at least in part substantially radially.

* * * * *